April 28, 1970  C. O. OBENLAND ET AL  3,509,216
PROCESS FOR PREPARING META- AND PARA-CARBORANE
Filed Sept. 30, 1966
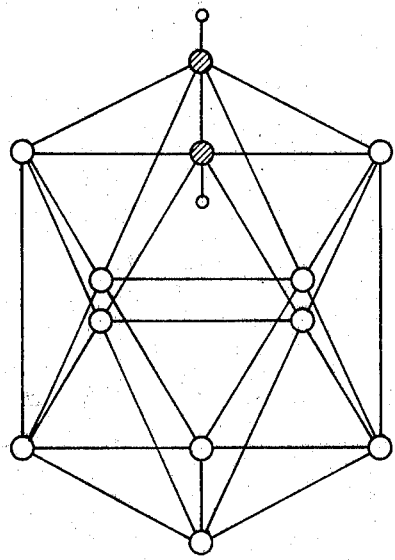
*A*
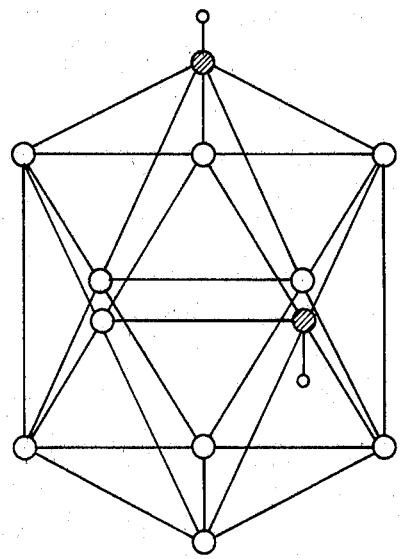
*B*
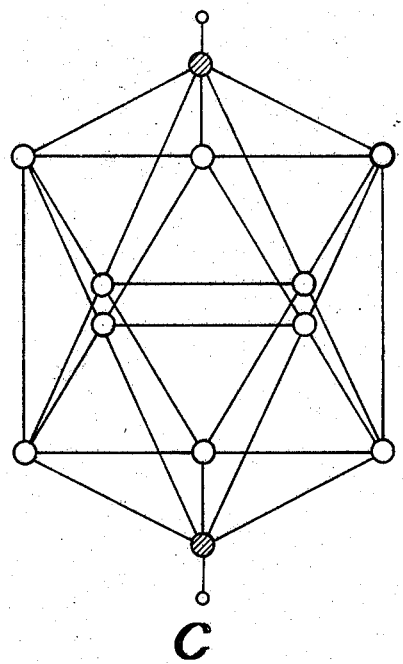
*C*
○ BORON
◉ CARBON
∘ HYDROGEN ON CARBON
(HYDROGEN ATOMS ON
BORON OMITTED FOR
CLARITY)
INVENTORS:
CLAYTON O. OBENLAND
STELVIO PAPETTI
BY Walter D. Hunter
AGENT

United States Patent Office 3,509,216
Patented Apr. 28, 1970

3,509,216
PROCESS FOR PREPARING META- AND PARA-CARBORANE
Clayton O. Obenland and Stelvio Papetti, Hamden, Conn., assignors to Olin Mathieson Chemical Corporation, a corporation of Virginia
Filed Sept. 30, 1966, Ser. No. 583,209
Int. Cl. C07f 9/02
U.S. Cl. 260—606.5         10 Claims This invention relates to a process for the preparation of organoboranes. More particularly, this invention relates to an improved process for the preparation of the isomers of carborane, namely, metacarborane and para-carborane.

The compound ortho-carborane, which may be represented by the formula:

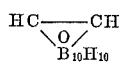

can be prepared as described in Ager, Heying and Mangold application Ser. No. 741,976, filed June 13, 1958, and now abandoned, by reacting decaborane in the presence of tetrahydrofuran for 12 hours at a temperature of about 125° C. in an autoclave pressured to 100 p.s.i. with acetylene. The structural formula of ortho-carborane is shown as Formula A in the figure. Ortho-carborane, which is a solid material having a melting point of 287° C., is an extremely stable compound.

When ortho-carboranes of the class:

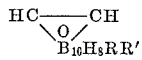

wherein R and R' are each selected from the group consisting of hydrogen and an alkyl radical having 1 to 5 carbon atoms are heated to a temperature of above 400° C. in an autoclave or bomb, a thermal isomerization takes place and the so-called meta-carboranes are formed. The meta-carboranes are likewise sometimes referred to as neocarboranes. For example, the compound:

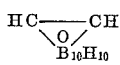

can be converted to meta-carborane by heating in a sealed tube or autoclave at a temperature of about 475° C. for 2 to 48 hours. The structural formula of the compound metacarborane is shown as Formula B in the figure.

In Heying and Papetti application Ser. No. 412,082, filed Nov. 18, 1964, now U.S. Patent No. 3,383,419, a method for the preparation of para-carborane is set forth in which orthocarborane, meta-carborane or a mixture of the two, is sealed in a heavy-walled combustion tube, a pressure bomb, or other suitable container, which preferably has previously been flushed with nitrogen, the container and contents are heated at a temperature of from about 550° C. to about 630° C. for about 7 to about 30 hours or more and the desired para-carborane is then recovered. In the figure the structural formula of para-carborane is shown as Formula C.

As pointed out above the present method for producing meta- and para-carborane involves heating ortho-carborane in a closed bomb for periods ranging from 2 to 48 hours. A temperature range of over 400° C. is required for conversion of ortho-carborane to meta-carborane while higher temperatures (550° C. or more) are required for conversion to para-carborane. A considerable pressure (estimated in the range of 200–500 p.s.i.g.) is developed in the bomb during the heating period. Among the other disadvantages of the processes known in the art are that: (1) the processes are batchwise (2) a considerable amount of mechanical labor is involved (3) special equipment is required, (4) a substantial amount of time is lost during bomb assembly and clean out after a run. In addition, product losses are experienced if the bomb leaks during the run and in all cases the pure isomer product can only be recovered after the crude product has been purified by crystallization or sublimation.

In the improved process of this invention the isomerization of ortho-carborane to meta-carborane and/or para-carborane is accomplished by continuously introducing ortho-carborane in gaseous phase into a reactor maintained at substantially atmospheric pressure and heated to a temperature of from about 450° C. to about 750° C., passing the gaseous ortho-carborane through the reactor and continuously withdrawing from the said reactor an isomer-containing reaction product stream. Recovery of the isomerized product from the reaction product stream can be accomplished in any convenient manner, such as by passing the gaseous product stream to an appropriate condenser from which the solid isomer products are removed as required. Thus, the reaction time is reduced from hours, as is employed in the prior art processes, to seconds.

For the production of meta-carborane, the reactor temperature will generally range from about 450° C. to about 650° C., with the preferred range being from about 500° C. to about 600° C., while the reactor residence times will usually vary from about 0.02 minute or lower to about 0.60 minute. In preparing para-carborane, the reactor temperature will range generally from about 650° C. to about 750° C. with the preferred range being from about 650° C. to about 700° C. Reactor residence times will range generally from about 0.02 minute or lower to about 0.6 minute in preparing para-carborane.

Although a wide variety of reactors may be employed, the preferred reactor is of the tube-type which must be constructed of suitable heat resistant material such as fused quartz, a fused silica glass, such as Vycor, or a metal such as stainless steel or titanium. The reactor tube, the diameter of which may be varied over a wide range and can be, for example 0.75 inch I.D., can be operated in a variety of positions, varying from horizontal to vertical, with suitable connections for the ortho-carborane vaporizer and sublimation condenser. If desired, an inert carrier gas such as helium, argon, nitrogen, or mixture thereof, can be utilized in introducing the ortho-carborane in gaseous phase into the reaction zone. For example, the inert carrier gas, which is preferably preheated, can be introduced directly into the sublimation vessel. The reactor may be filled with an inert, heat-resistant packing such as ceramic saddles, pieces of fused quartz, fused silica glass or an unpacked tube may be utilized. In the continuous process of this invention the feed in gaseous phase is conveniently prepared by sublimation of the ortho-carborane in a suitable externally-heated sublimation vessel. The sublimation condenser may be either air or water-cooled and can, if desired, be equipped with internal scrapers and discharge ports to permit venting the carrier gas and to permit product removal without process interruption. In large installations pumps or turbines may be employed to force the gaseous ortho-carborane and/or carrier gas through the reactor. The carrier gas leaving the condenser can be recycled to the vaporizer, if desired. Heating the reactor can be accomplished in a variety of ways such as by external electrical heating, etc.

One of the distinct advantages of this process is that when meta-carborane is prepared at temperatures of from about 500° C. to about 600° C. the resulting product is of such purity that no additional purification steps are required. However, when temperatures of above about 600° C. are employed in the continuous process of this invention, it has been found that a mixed product containing both meta- and para-carborane results. The isomers of ortho-carborane, i.e., meta- and para-carborane, present in the crude product can be conveniently separated by a variety of methods well known in the art, such as by vapor phase chromatography, column elution chromatography, zone refining, etc.

Meta-carborane or para-carborane prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The meta- and para-carboranes of this invention when incorporated with oxidizers, are capable of being formed into a wide variety of grains, tablets, and shapes, all with desirabe mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate various embodiments of this invention but are not to be considered as limiting its scope:

EXAMPLE I

A fused silica tube (approx. 1" I.D. and 36" length) was filled with ¼" ceramic "Berl" saddles. The tube was supported in a horizontal position and heated to 600° C. (outside wall temperature as measured by thermocouple) using two electric tube furnaces placed end to end. Total heated length of tube was 26". A small glass vaporizing tube, containing 30 grams of ortho-carborane, was attached to the end of the fused silica tube. The vaporizer was heated to a temperature of 150–200° C. while a stream of helium (800 ml./min.—measured at 25° C. and atmospheric pressure) was passed through it as a carrier gas. The mixed stream of helium and vaporized ortho-carborane was passed through the hot fused silica tube, (residence time approx. 0.09 min., mass flow rate of carborane, 0.55 gm./min.) and the vapors of meta-carborane were condensed in a sublimation condenser which was attached directly to the outlet of the fused silica tube. During a period of 55 minutes, 24.3 g. of pure meta-carborane was formed, giving a yield of 81 percent.

EXAMPLE II

The apparatus employed in Example I was utilized in this experiment. The fused silica tube was heated to 550° C. (outside wall temperature) and 40 grams of ortho-carborane were vaporized (temperature of vaporizer: 150°–200° C.) under a helium flow of 400 ml./min.—measured at 25° C.—atmospheric pressure (0.20 min, residence time mass flow rate of carborane 0.12 g./min.). Over a five hour period, 36.1 g. of pure meta-carborane was collected (90.3 percent yield).

EXAMPLE III

Using the apparatus of Example I an additional experiment was conducted in which the fused silica tube, without packing, was heated to 600° C. (outside wall temperature). Ten grams of ortho-carborane were vaporized (temperature of vaporizer: 150°–200° C.) under a helium flow rate of 600 ml./min. (measured at 25° C.—atmospheric pressure) (residence time of 0.20 min.; mass flow rate of carborane, 0.20 gm./min.). During a 50 minute period, 9.2 g. of pure meta-carborane was collected, a yield of 92 percent.

EXAMPLE IV

In this example the experiment of Example III was repeated at the same temperatures and flow rate. A conversion of 22.5 grams of ortho-carborane to 20.4 grams of pure meta-carborane, over a period of 45 minutes was achieved. (Mass flow rate of ortho-carborane, 0.50 g./min.). Yield was 90.7 percent.

EXAMPLE V

In this example the apparatus of Example I was utilized with the exception that the vaporizer employed was an externally heated glass vessel of 500 ml. capacity. A conversion of 125 g. of ortho-carborane to 118.2 g. of pure meta-carborane, over a period of 58 minutes was achieved at a reactor tube temperature of 600° C. The carrier gas was nitrogen which at the rate of 250 ml. per minute (measured at 25° C.—atmospheric pressure) was sent through a preheater where it was heated to a temperature of 150°–200° C. before being introduced into the vaporizer which was maintained at a temperature of about 150°–200° C. Yield of meta-carborane was 94.5 percent.

EXAMPLE VI

With the same temperature, for the reactor tube, the vaporizer, and carrier gas preheater and the same flow rate as utilized in Example V, 222 g. of ortho-carborane were vaporized and converted to 202.5 g. meta-carborane in 77 minutes. (Mass flow rate of carborane was 2.89 g./min.). Yield was 91.3 percent.

EXAMPLE VII

In this experiment the apparatus of Example I was employed. The reactor tube was heated to 700° C. and 10.0 g. of ortho-carborane was vaporized (temperature of vaporizer: 150°–200° C.) into a stream of helium carrier gas (400 ml./min.—measured at 25° C.—atmospheric pressure; reactor residence time of 0.17 min.; mass flow rate of carborane, 0.17 g./min.) and passed through the hot tube over a period of about one hour. Eight grams of sublimate was collected, which was shown by infrared analysis to be a mixture of approx. 80 percent meta-carborane and 20 percent para-carborane. Yield of para-carborane was 16 percent.

EXAMPLE VIII

The experiment of Example VII was repeated at the same temperature for the reactor tube and vaporizer but with a reduced carrier gas flow (200 ml./min.—measured at 25° C.—atmospheric pressure, mass flow rate of ortho-carborane, 0.25 g./min.). Fifteen grams of ortho-carborane gave 8.4 g. of sublimated product which was determined by infrared analysis to be a mixture of approximately 60 percent meta-carborane and 40 percent para-carborane. The yield of para-carborane was 22 percent.

What is claimed is:

1. A process for the preparation of an isomer of ortho-carborane selected from the group consisting of meta- and para-carborane, which comprises continuously introducing ortho-carborane in gaseous phase into a reactor maintained at a temperature of from about 450° C. to about 750° C., passing the said gaseous ortho-carborane through the said reactor, continuously withdrawing from said reactor a reaction product stream containing the isomer of carborane and recovering said isomer from the reaction product stream, the pressure in said reaction zone being substantially atmospheric.

2. The process of claim 1 wherein the reactor residence time is about 0.02 minute to about 0.60 minute.

3. The process of claim 1 wherein the said gaseous ortho-carborane is introduced into the reactor in an inert carrier gas.

4. The process for the preparation of meta-carborane which comprises continuously introducing ortho-carborane in gaseous phase into a reactor maintained at a temperature of from about 450° C. to about 650° C. passing the said gaseous ortho-carborane through the reactor, continuously withdrawing from said reactor a reaction product stream containing meta-carborane, and recovering said meta-carborane from the reaction product stream, the pressure in said reaction zone being substantially atmospheric.

5. The process of claim 4 wherein the reactor residence time is from about 0.02 minute to about 0.60 minute.

6. The process of claim 4 wherein the said gaseous ortho-carborane is introduced into the reactor in an inert carrier gas.

7. The process of claim 4 wherein the said reactor is maintained at a temperature of from about 500° C. to about 600° C., the reactor residence time is from about 0.02 minute to about 0.60 minute, and the said gaseous ortho-carborane is introduced into the reactor in an inert carrier gas.

8. The process for the preparation of para-carborane which comprises continuously introducing ortho-carborane in gaseous phase into a reactor maintained at a temperature of from about 650° C. to about 750° C. passing the said gaseous ortho-carborane through the reactor, continuously withdrawing from said reactor a reaction product stream containing para-carborane and recovering said para-carborane, the pressure in said reaction zone being substantially atmospheric.

9. The process of claim 8 wherein the reactor residence time is from about 0.02 minute to about 0.60 minute.

10. The process of claim 8 wherein the said gaseous ortho-carborane is introduced into the reactor in an inert carrier gas.

References Cited

UNITED STATES PATENTS

| | | | |
|---|---|---|---|
| 3,355,496 | 11/1967 | Schoenfelder et al. | 260—606.5 |
| 3,376,347 | 4/1968 | Fein et al. | 260—606.5 |
| 3,383,419 | 5/1968 | Heying et al. | 260—606.5 |

TOBIAS E. LEVOW, Primary Examiner

W. F. BELLAMY, Assistant Examiner